(12) United States Patent
Kim et al.

(10) Patent No.: US 11,654,739 B2
(45) Date of Patent: May 23, 2023

(54) VEHICLE SUSPENSION CONTROL APPARATUS AND METHOD THEREOF

(71) Applicants: Hyundai Motor Company, Seoul (KR); Kia Corporation, Seoul (KR)

(72) Inventors: Hyung Jin Kim, Seoul (KR); Byung Joo Kim, Seoul (KR); Jong Hoon Choi, Gyeonggi-do (KR); Young Jae Kim, Gyeonggi-do (KR); In Yong Jung, Incheon (KR); Yoon Kab Noh, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/668,150

(22) Filed: Feb. 9, 2022

(65) Prior Publication Data

US 2023/0013516 A1 Jan. 19, 2023

(30) Foreign Application Priority Data

Jul. 19, 2021 (KR) ........................ 10-2021-0094475

(51) Int. Cl.
*B60G 17/0165* (2006.01)
*B60G 17/019* (2006.01)

(52) U.S. Cl.
CPC ....... *B60G 17/0165* (2013.01); *B60G 17/019* (2013.01); *B60G 2400/0532* (2013.01); *B60G 2400/102* (2013.01); *B60G 2500/10* (2013.01); *B60G 2600/14* (2013.01); *B60G 2600/172* (2013.01); *B60G 2800/91* (2013.01)

(58) Field of Classification Search
CPC ............. B60G 17/0165; B60G 17/019; B60G 2400/0532; B60G 2400/102; B60G 2500/10; B60G 2600/14; B60G 2600/172; B60G 2800/91
See application file for complete search history.

(56) References Cited

U.S. PATENT DOCUMENTS

| | | | |
|---|---|---|---|
| 5,794,966 A * | 8/1998 | MacLeod ............. | B60G 21/073 280/5.507 |
| 8,762,000 B2 | 6/2014 | Schindler et al. | |
| 10,160,447 B2 * | 12/2018 | Lavoie .................. | B60W 50/00 |
| 10,275,662 B1 * | 4/2019 | Askeland ............. | G06T 7/0004 |
| 10,421,465 B1 * | 9/2019 | Jutkowitz ............. | G05D 1/0061 |
| 10,486,485 B1 * | 11/2019 | Levinson ........... | B60G 17/0162 |
| 10,821,968 B2 * | 11/2020 | Cho ....................... | B60W 10/18 |
| 11,055,550 B2 * | 7/2021 | Kim ....................... | G06V 10/98 |

(Continued)

FOREIGN PATENT DOCUMENTS

| | | |
|---|---|---|
| KR | 2019-0128290 A | 11/2019 |
| KR | 2021-0022296 | 3/2021 |
| KR | 10-2023-0015205 A | 1/2023 |

*Primary Examiner* — Toan C To

(74) *Attorney, Agent, or Firm* — Fox Rothschild LLP (57) ABSTRACT

A vehicle suspension control apparatus includes a mode determination device that determines a mode of a shock absorber for a vehicle, corresponding to an identified speed bump, when the speed bump is identified in front of the vehicle, a suspension control amount calculation device that calculates an amount of suspension control for passing over the speed bump, based on the determined mode of the shock absorber, and a controller that controls a suspension of the vehicle based on the calculated amount of suspension control.

18 Claims, 5 Drawing Sheets

DAMPING FORCE ACCORDING TO MODE OF SHOCK ABSORBER (56) References Cited

U.S. PATENT DOCUMENTS

| | | |
|---|---|---|
| 11,110,770 B2 | 9/2021 | Kim |
| 2008/0015743 A1* | 1/2008 | Haug .................. B60T 7/22 |
| | | 701/1 |
| 2013/0103259 A1* | 4/2013 | Eng .................. B60G 17/0165 |
| | | 701/37 |
| 2014/0336842 A1* | 11/2014 | Jang .................. G06V 20/58 |
| | | 701/1 |
| 2015/0336546 A1* | 11/2015 | Al-Zahrani .............. B60T 7/12 |
| | | 701/93 |
| 2017/0137023 A1* | 5/2017 | Anderson .............. B60G 17/02 |
| 2018/0082492 A1* | 3/2018 | Stanek .................. G07C 5/0808 |
| 2018/0186210 A1* | 7/2018 | Noll .................. B60G 17/018 |
| 2019/0344634 A1* | 11/2019 | Kim .................. B60G 17/0165 |
| 2020/0247208 A1* | 8/2020 | Kunkel .................. B60G 17/06 |
| 2021/0053409 A1 | 2/2021 | Kim |
| 2022/0185283 A1* | 6/2022 | Kim .................. B60W 10/184 |
| 2023/0027706 A1 | 1/2023 | Kim et al. |

* cited by examiner

VEHICLE SUSPENSION CONTROL APPARATUS AND METHOD THEREOF

CROSS-REFERENCE TO RELATED APPLICATION

This application claims under 35 U.S.C. § 119(a) the benefit of Korean Patent Application No. 10-2021-0094475, filed in the Korean Intellectual Property Office on Jul. 19, 2021, the entire contents of which are incorporated herein by reference.

BACKGROUND

(a) Technical Field

The present disclosure relates to a vehicle suspension control apparatus and a method thereof.

(b) Description of the Related Art

An electronic control suspension (ECS), which is a vehicle body control system included in a vehicle, may change a height of a vehicle body depending on a road surface state and/or a driving state to provide a driver (or a user) of the vehicle with ride comfort and/or stability. For example, when the vehicle drives over a speed bump located in a driving direction of the vehicle, the ECS included in the vehicle may control a suspension of the vehicle to reduce a shock of the vehicle body delivered to the driver. However, when the ECS does not predict a behavior of the vehicle in response to a shock applied to the vehicle, it may fail to provide accurate and safe suspension control.

In general, the ECS of the vehicle may control a suspension of the vehicle with regard to a shock absorber included in the suspension of the vehicle. The shock absorber may be a device which absorbs and/or dampens a received shock when the vehicle receives the shock. For example, when the vehicle crosses a speed bump, the shock absorber may apply a damping force to a damper included in the shock absorber to absorb the shock received by the vehicle.

A general shock absorber may be designed and manufactured to have a specific damping force depending on a specific speed of the damper. Herein, when a real shock is applied to the vehicle, the shock absorber may have a damping force greater than or less than the designed damping force to generate an error. Thus, when the ECS of the vehicle does not predict the error of the above-mentioned shock absorber in response to a shock to be applied to the vehicle, it may fail to provide accurate and safe suspension control.

SUMMARY

An aspect of the present disclosure provides an apparatus and a method for predicting a behavior of a vehicle in response to a shock to be applied to the vehicle and accurately and safely controlling a suspension.

Furthermore, another aspect of the present disclosure provides an apparatus and a method for predicting an error of a shock absorber for vehicle in response to a shock to be applied to the vehicle and accurately and safely controlling the suspension.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle suspension control apparatus may include a mode determination device that determines a mode of a shock absorber for vehicle, the mode corresponding to an identified speed bump, when the speed bump is identified in front of a vehicle, a suspension control amount calculation device that calculates an amount of suspension control for passing over the speed bump, based on the determined mode of the shock absorber, and a controller that controls a suspension of the vehicle based on the calculated amount of suspension control.

Furthermore, according to embodiments, the determined mode of the shock absorber may indicate one of a first mode, a second mode, or a third mode. The determined mode of the shock absorber may be determined based on a count value for the first mode, a count value for the second mode, and a count value for the third mode. The count value may indicate a value counted in response to determining the mode of the shock absorber, the mode corresponding to the identified speed bump.

Furthermore, according to embodiments, the determined mode of the shock absorber may be determined based on a difference value between the count value for the first mode and the count value for the second mode, a difference value between the count value for the second mode and the count value for the third mode, and a difference value between the count value for the third mode and the count value for the first mode.

Furthermore, according to embodiments, the determined mode of the shock absorber may be determined based on the largest count value among the count value for the first mode, the count value for the second mode, and the count value for the third mode.

Furthermore, according to embodiments, a damping force of the shock absorber based on the first mode may be greater than a damping force of the shock absorber based on the second mode. A damping force of the shock absorber based on the third mode may be less than the damping force of the shock absorber based on the second mode.

Furthermore, according to embodiments, the count value for the first mode, the count value for the second mode, and the count value for the third mode may be counted based on at least one of type information of the speed bump or behavior information of a vehicle passing over the speed bump.

Furthermore, according to embodiments, the behavior information of the vehicle passing over the speed bump may include at least one of maximum vertical acceleration information of the vehicle or maximum pitch rate information of the vehicle.

Furthermore, according to embodiments, the count value for the first mode may be counted in response to the behavior information of the vehicle being greater than or equal to a predetermined first value. The count value for the third mode may be counted in response to the behavior information of the vehicle being less than or equal to a predetermined second value. The predetermined first value may be greater than the predetermined second value. The count value for the second mode may be counted in response to the behavior information of the vehicle being greater than the predetermined second value or less than the predetermined first value.

Furthermore, according to embodiments, the calculated amount of suspension control may indicate one of an amount of suspension control calculated based on the first mode, an amount of suspension control calculated based on the second mode, or an amount of suspension control calculated based on the third mode. The amount of suspension control calculated based on the first mode may be less than the amount of suspension control calculated based on the second mode. The amount of suspension control calculated based on the third mode may be greater than the amount of suspension control calculated based on the second mode.

Furthermore, according to embodiments, the amount of suspension control may include at least one of an amount of control for a speed offset of the vehicle, an amount of control for a bump of the vehicle, or an amount of control for a sky hook of the vehicle.

According to another aspect of the present disclosure, a vehicle suspension control method may include determining a mode of a shock absorber for vehicle, the mode corresponding to an identified speed bump, when the speed bump is identified in front of a vehicle, calculating an amount of suspension control for passing over the speed bump, based on the determined mode of the shock absorber, and controlling a suspension of the vehicle based on the calculated amount of suspension control.

Furthermore, according to embodiments, the determined mode of the shock absorber may indicate one of a first mode, a second mode, or a third mode. The determined mode of the shock absorber may be determined based on a count value for the first mode, a count value for the second mode, and a count value for the third mode. The count value may indicate a value counted in response to determining the mode of the shock absorber, the mode corresponding to the identified speed bump.

Furthermore, according to embodiments, the determined mode of the shock absorber may be determined based on a difference value between the count value for the first mode and the count value for the second mode, a difference value between the count value for the second mode and the count value for the third mode, and a difference value between the count value for the third mode and the count value for the first mode.

Furthermore, according to embodiments, the determined mode of the shock absorber may be determined based on the largest count value among the count value for the first mode, the count value for the second mode, and the count value for the third mode.

Furthermore, according to embodiments, a damping force of the shock absorber based on the first mode may be greater than a damping force of the shock absorber based on the second mode. A damping force of the shock absorber based on the third mode may be less than the damping force of the shock absorber based on the second mode.

Furthermore, according to embodiments, the count value for the first mode, the count value for the second mode, and the count value for the third mode may be counted based on at least one of type information of the speed bump or behavior information of a vehicle passing over the speed bump.

Furthermore, according to embodiments, the behavior information of the vehicle passing over the speed bump may include at least one of maximum vertical acceleration information of the vehicle or maximum pitch rate information of the vehicle.

Furthermore, according to embodiments, the count value for the first mode may be counted in response to the behavior information of the vehicle being greater than or equal to a predetermined first value. The count value for the third mode may be counted in response to the behavior information of the vehicle being less than or equal to a predetermined second value. The predetermined first value may be greater than the predetermined second value. The count value for the second mode may be counted in response to the behavior information of the vehicle being greater than the predetermined second value or less than the predetermined first value.

Furthermore, according to embodiments, the calculated amount of suspension control may indicate one of an amount of suspension control calculated based on the first mode, an amount of suspension control calculated based on the second mode, or an amount of suspension control calculated based on the third mode. The amount of suspension control calculated based on the first mode may be less than the amount of suspension control calculated based on the second mode. The amount of suspension control calculated based on the third mode may be greater than the amount of suspension control calculated based on the second mode.

Furthermore, according to embodiments, the amount of suspension control may include at least one of an amount of control for a speed offset of the vehicle, an amount of control for a bump of the vehicle, or an amount of control for a sky hook of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the accompanying drawings. In adding the reference numerals to the components of each drawing, it should be noted that the identical component is designated by the identical numerals even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 5.

Figure 1:
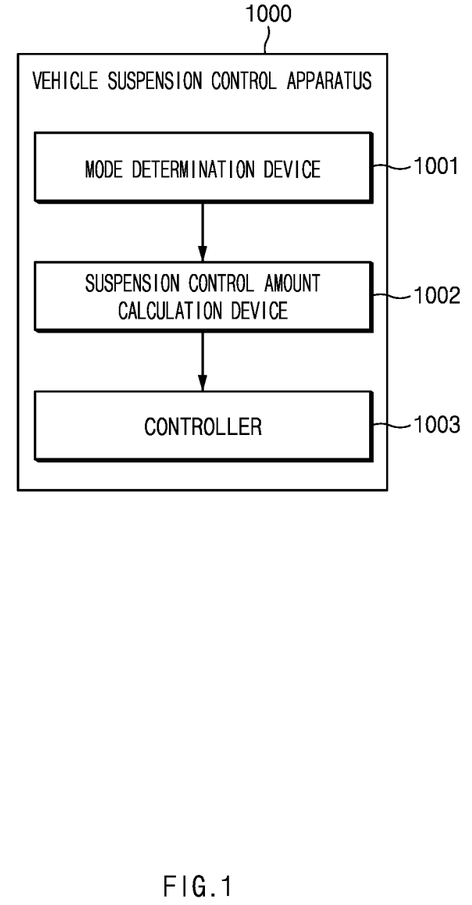
FIG. 1 illustrates a vehicle suspension control apparatus according to embodiments.

FIG. 1 illustrates a vehicle suspension control apparatus 1000 according to embodiments.

FIG. 1 is a block diagram illustrating an example of the vehicle suspension control apparatus (or the apparatus) 1000 according to embodiments.

An electronic control suspension (ECS), which is a vehicle body control system included in a vehicle, may change a height of a vehicle body depending on a road surface state and/or a driving state to provide a driver (or a user) of the vehicle with ride comfort and/or stability. For example, when the vehicle drives on a speed bump located in its driving direction, the ECS may control a suspension of the vehicle to reduce a shock of the vehicle body delivered to the driver. However, when the ECS does not predict a behavior of the vehicle in response to a shock to be applied to the vehicle, it may fail to provide accurate and safe suspension control.

In general, the ECS of the vehicle may control a suspension of the vehicle with regard to a shock absorber included in the suspension of the vehicle. The shock absorber may be a device which absorbs and/or dampens a received shock, when the vehicle receives the shock. For example, the vehicle crosses a speed bump, the shock absorber may apply a damping force to a damper included in the shock absorber to absorb a shock received by the vehicle.

A general shock absorber may be designed and manufactured to have a specific damping force depending on a specific speed of the damper. Herein, when a real shock is applied to the vehicle, the shock absorber may have a damping force greater than or less than the designed damping force to generate an error.

Thus, when the ECS of the vehicle does not predict an error of the above-mentioned shock absorber in response to a shock to be applied to the vehicle, it may fail to provide accurate and safe suspension control.

The apparatus 1000 according to embodiments may predict a behavior of the vehicle in response to a shock to be applied to the vehicle and may provide accurate and safe suspension control. Furthermore, the apparatus 1000 according to embodiments may predict an error of a shock absorber for vehicle in response to a shock to be applied to the vehicle and may provide accurate and safe suspension control.

The vehicle suspension control apparatus 1000 according to embodiments may include a mode determination device 1001, a suspension control amount calculation device 1002, and/or a controller 1003. The apparatus 1000 according to embodiments may be included inside or outside the vehicle. The apparatus 1000 according to embodiments may further include one or more elements which is or are not shown in FIG. 1.

The vehicle according to embodiments may identify a speed bump located in a driving direction of the vehicle (e.g., in front of the vehicle), while the vehicle is traveling. The vehicle may identify a speed bump located in front of the vehicle based on a light detection and ranging (LiDAR), a camera, and/or a time of flight (TOF) sensor included in the vehicle.

The mode determination device 1001 according to embodiments may determine a mode of a shock absorber for vehicle, corresponding to the speed bump, in response to the speed bump being identified in front of the vehicle.

The mode of the shock absorber according to embodiments may be generated based on an error of the above-mentioned shock absorber. As described above, the damping force of the shock absorber may be designed in advance at the time of manufacture. Herein, the damping force of the shock absorber included in the finished vehicle may be greater or less than a previously designed damping force. A damping force greater than the previously designed damping force may be referred to as an upper limit damping force, and a damping force less than the previously designed damping force may be referred to as a lower limit damping force.

The mode of the shock absorber according to embodiments may indicate one of a first mode, a second mode, or a third mode. The first mode may be a mode based on the upper limit damping force, the second mode may be a mode based on the previously designed damping force, and the third mode may be a mode based on the lower limit damping force. In other words, a damping force of the shock absorber based on the first mode may be greater than a damping force of the shock absorber based on the second mode, and a damping force of the shock absorber based on the third mode may be less than the damping force of the shock absorber based on the second mode.

A shock to be applied to the vehicle may vary with a type of a speed bump according to embodiments. Thus, the mode of the shock absorber for vehicle according to embodiments may be determined in response to the identified speed bump. For example, the apparatus 1000 may previously determine a mode of the shock absorber needed for each type of the identified speed bump and may determine a mode of the shock absorber corresponding to a subsequently identified speed bump.

The suspension control amount calculation device 1002 according to embodiments may calculate an amount of suspension control for passing over the speed bump, based on the determined mode of the shock absorber.

The amount of suspension control according to embodiments may be an amount of control applied to the suspension of the vehicle to absorb and/or dampen a shock of the vehicle, in response to the shock of the vehicle. In other words, an amount of suspension control needed when the shock of the vehicle is large may be greater than an amount of suspension control needed when the shock of the vehicle is small.

When the shock absorber according to embodiments has the upper limit damping force, because a damping force more than necessary is applied to the damper, too stiff ride comfort may be provided to a driver, when the vehicle passes over the speed bump. Thus, when the mode of the shock absorber is determined as the first mode, the suspension control amount calculation device 1002 may calculate an amount of suspension control based on a damping force less than the designed damping force.

When the shock absorber according to embodiments has the lower limit damping force, because an insufficient damping force is applied to the damper, too soft ride comfort may be provided to the driver, when the vehicle passes over the speed bump. Thus, when the mode of the shock absorber is determined as the third mode, the suspension control amount calculation device 1002 may calculate an amount of suspension control based on a damping force greater than the designed damping force.

In other words, the amount of suspension control according to embodiments may indicate one of an amount of suspension control calculated based on the first mode, an amount of suspension control calculated based on the second mode, or an amount of suspension control calculated based on the third mode. The amount of suspension control calculated based on the first mode may be less than the amount of suspension control calculated based on the second mode. Furthermore, the amount of suspension control calculated based on the third mode may be greater than the amount of suspension control calculated based on the second mode.

The controller 1003 according to embodiments may control the suspension of the vehicle based on the calculated amount of suspension control. For example, the controller 1003 indicates the above-mentioned ECS of the vehicle.

Through the method described in FIG. 1, the apparatus 1000 according to embodiments may predict a behavior of the vehicle and may control the suspension, when the speed bump to apply a shock to the vehicle is identified. Furthermore, when the speed bump to apply the shock to the vehicle is identified, the apparatus 1000 may predict an error of the shock absorber for vehicle, which is capable of being generated in response to the identified speed bump, and may reflect an error of the shock absorber in advance to control the suspension.

Figure 2:
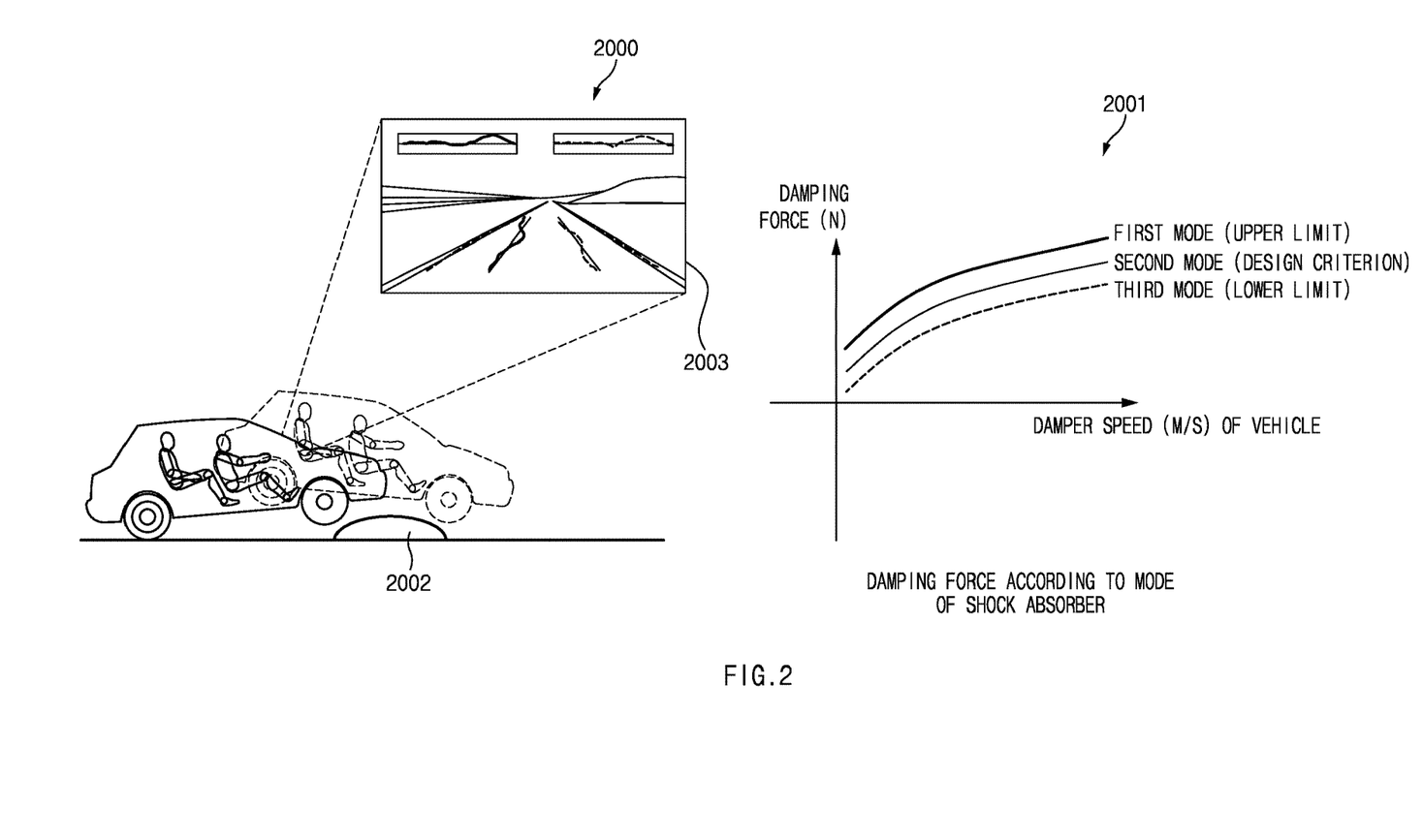
FIG. 2 is a drawing illustrating an example of an operation of a shock absorber for vehicle for a vehicle traveling on a speed bump according to embodiments.

FIG. 2 is a drawing illustrating an example of an operation of a shock absorber for vehicle for a vehicle traveling on a speed bump according to embodiments.

FIG. 2 is a drawing illustrating an operation of a shock absorber for vehicle (e.g., a shock absorber described in FIG. 1) for a vehicle traveling on a speed bump (e.g., a speed bump described in FIG. 1) according to embodiments.

Reference number 2000 denotes an example of the vehicle traveling on the speed bump according to embodiments. Reference number 2001 is a graph illustrating an example of a damping force a shock absorber has, when a shock is applied to the vehicle according to embodiments.

Reference number 2002 denotes a speed bump according to embodiments. As described above with reference to FIG. 1, the vehicle according to embodiments may identify a speed bump. For example, the vehicle may identify a speed bump located in front of the vehicle in a driving direction of the vehicle based on a LiDAR Reference number 2003 may be a screen captured such that the vehicle identifies the above-mentioned speed bump according to embodiments. As described above, the vehicle may identify the speed bump based on the LiDAR, a camera, and/or a TOF sensor. The vehicle according to embodiments may ascertain a type of the identified speed bump. For example, the vehicle may ascertain a length and a height of the identified speed bump to ascertain a type of the speed bump.

As described above with reference to FIG. 1, a shock to be applied the vehicle may vary with a type of the speed bump. Thus, a mode about a damping force of a shock absorber may be determined based on information about the type of the speed bump.

For example, when identifying the speed bump, the vehicle (or an apparatus 1000) may identify a type of the speed bump and may determine a mode of the shock absorber corresponding to the type of the speed bump. The vehicle may determine a mode of the shock absorber a plurality of number of times with respect to the speed bump. The vehicle may determine a mode of the shock absorber depending on the mode of the shock absorber, which is determined a plurality of number of times, in response to the same type of speed bump being subsequently identified.

For example, the vehicle may determine a mode of the shock absorber based on a count value for the above-mentioned modes. In other words, the mode of the shock absorber may be determined based on a count value for the first mode, a count value for the second mode, and a count value for the third mode. A count value for a specific mode may be counted, when the vehicle determines the specific mode. In other words, when the vehicle determines the first mode in response to the identified type of the speed bump, the count value for the first mode may be counted (e.g., by +1). In other words, the count value may indicate a value counted in response to determining the mode of the shock absorber, the mode corresponding to the identified speed bump.

As described above, reference number 2001 is a graph illustrating an example of a damping force a shock absorber has, when a shock is applied to the vehicle according to embodiments.

As described above with reference to FIG. 1, the determined mode of the shock absorber may indicate one of the first mode (an upper limit damping force), the second mode (a design criterion damping force), or the third mode (a lower limit damping force). Furthermore, as described above with reference to FIG. 1, the shock absorber may be designed to have a specific damping force depending on a specific speed of a damper. The x-axis of the graph shown in 2001 may be an axis indicating the damper speed of the vehicle, and the y-axis may be an axis indicating the damping force of the shock absorber.

As describe above with reference to FIG. 1, a damping force of the shock absorber based on the first mode may be greater than a damping force of the shock absorber based on the second mode, and a damping force of the shock absorber based on the third mode may be less than the damping force of the shock absorber based on the second mode. Thus, as shown in the graph shown in 2001, the damping force of the shock absorber based on the first mode may have the largest value, and the damping force of the shock absorber based on the third mode may have the smallest value.

Through the method described in FIG. 2, the apparatus 1000 according to embodiments may predict a behavior of the vehicle and may control the suspension, when the speed bump to apply a shock to the vehicle is identified. Furthermore, when the speed bump to apply the shock to the vehicle, the apparatus 1000 may predict an error of the shock absorber for vehicle, which is capable of being generated in response to the identified speed bump, and may reflect the error of the shock absorber in advance to control the suspension.

Figure 3:
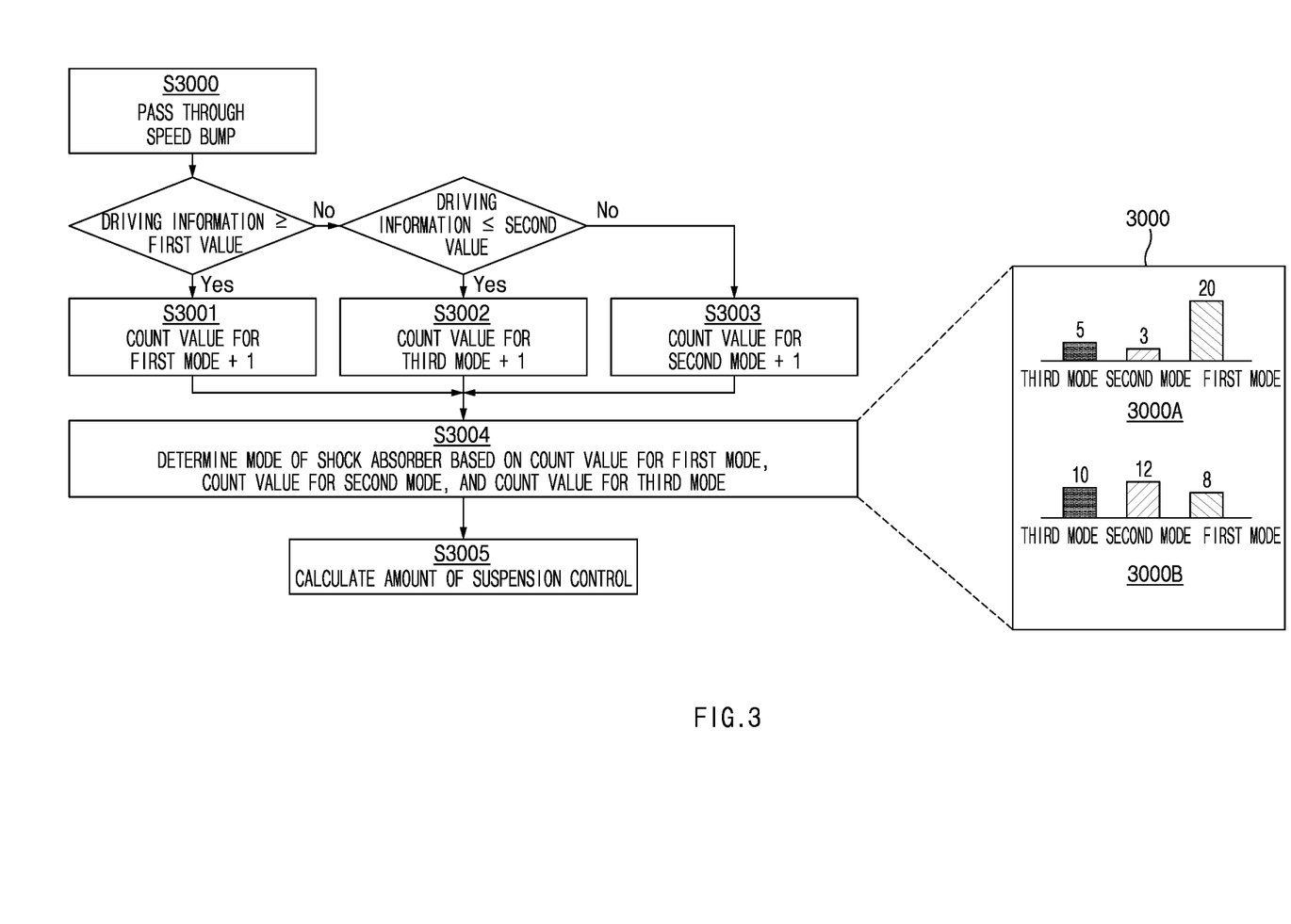
FIG. 3 is a drawing illustrating an example of an operation where a mode determination device determines a mode of a shock absorber according to embodiments.

FIG. 3 is a drawing illustrating an example of an operation where a mode determination device 1001 determines a mode of a shock absorber according to embodiments.

FIG. 3 is a flowchart illustrating an example of an operation where a mode determination device (e.g., the mode determination device 1001 of FIG. 1) determines a mode of a shock absorber (e.g., a shock absorber described in FIGS. 1 and 2) according to embodiments.

As described above with reference to FIG. 2, the mode of the shock absorber may be determined based on the count value for the first mode, the count value for the second mode, and the count value for the third mode.

According to embodiments, the count value for the first mode, the count value for the second mode, and the count value for the third mode may be counted based on at least one of type information of a speed bump or behavior information of a vehicle passing over the speed bump.

The type information of the speed bump according to embodiments may indicate information about a type of the speed bump described above with reference to FIG. 2. For example, the type information of the speed bump may indicate one of a speed bump complying with Ministry of Construction and Transportation 1, a speed bump complying with Ministry of Construction and Transportation 2, a speed bump complying with Ministry of Construction and Transportation 3, a barrel bump, or a navigation bump.

The behavior information of the vehicle passing over the speed bump according to embodiments may include at least one of maximum vertical acceleration information of the vehicle or maximum pitch rate information of the vehicle. For example, the behavior information indicates the maximum vertical acceleration information or the maximum pitch rate of the vehicle passing over the speed bump. The above-mentioned behavior information may indicate driving information described in FIG. 3.

First of all, in S3000, the vehicle according to embodiments may pass over a speed bump. The mode determination device 1001 according to embodiments may determine a mode of a shock absorber, in response to the vehicle passing over the speed bump. Furthermore, as described above with reference to FIG. 2, when the mode determination is performed a plurality of number of times, an apparatus 1000 may determine the mode of the shock absorber before the vehicle passes over the speed bump.

In S3001, the apparatus 1000 (e.g., a mode determination device 1001) according to embodiments may count a count value for a first mode (e.g., by +1) in response to the behavior information of the vehicle being greater than or equal to a predetermined first value. Furthermore, in S3002, the mode determination device 1001 may count a count value for a third mode in response to the behavior information of the vehicle being less than or equal to a predetermined second value. Furthermore, in S3003, the mode determination device 1001 may count a count value for a second mode in response to the behavior information of the vehicle being greater than the predetermined second value and less than the predetermined first value.

As described above with reference to FIGS. 1 and 2, the first mode may be a mode based on an upper limit damping force, and the third mode may be a mode based on a lower limit damping force. That the shock absorber has a damping force higher than a design criterion damping force refers to behavior information higher than behavior information of the vehicle capable of absorbing the design criterion damping force being generated when the vehicle passes over the speed bump. Furthermore, that the shock absorber has a damping force lower than the design criterion damping force refers to behavior information lower than the behavior information of the vehicle capable of absorbing the design criterion damping force being generated when the vehicle passes over the speed bump. Thus, the predetermined first value may be greater than the predetermined second value.

In S3004, the mode determination device 1001 according to embodiments may determine a mode of the shock absorber based on the count value for the first mode, the count value for the second mode, and the count value for the third mode. 3000 is a drawing illustrating an example of a method where the mode determination device 1001 determines a mode of the shock absorber according to embodiments.

The mode determination device 1001 according to embodiments may determine a mode based on the largest count value among the count value for the first mode, the count value for the second mode, or the count value for the third mode. For example, as shown in 3000A, the mode of the shock absorber may be counted a total of 30 times, and the first mode may be counted a total of 20 times. In this case, the mode determination device 1001 may determine (or count) the first mode before the vehicle enters the speed bump, in response to the same type of speed bump being identified later.

The mode determination device 1001 according to embodiments may determine a mode based on a difference value between the count value for the first mode and the count value for the second mode, a difference value between the count value for the second mode and the count value for the third mode, and a difference value between the count value for the third mode and the count value for the first mode. For example, as shown in 3000B, the mode of the shock absorber may be determined a total of 30 times, the difference value between the count value for the first mode and the count value for the second mode may be 4, the difference value between the count value for the second mode and the count value for the third mode may be 2, and the difference value between the count value for the third mode and the count value for the first mode may be 2. In this case, when a difference in count value between the modes is not large, the mode determination device 1001 may determine (or count) the second mode before the vehicle enters the speed bump, in response to the same type of speed bump being identified later. In other words, when the difference in the count value between the modes is not large, the mode determination device 1001 may determine the second mode based on the design criterion damping force.

In S3005, a suspension control amount calculation device (e.g., a suspension control amount calculation device 1002 of FIG. 1) according to embodiments may calculate an amount of suspension control for passing over the speed bump, based on the determined mode of the shock absorber.

Through the method described in FIG. 3, the apparatus 1000 according to embodiments may predict a behavior of the vehicle and may control the suspension, when the speed bump to apply a shock to the vehicle is identified. Furthermore, when the speed bump to apply the shock to the vehicle is identified, the apparatus 1000 may predict an error of the shock absorber for vehicle, which is capable of being generated in response to the identified speed bump, and may reflect the error of the shock absorber in advance to control the suspension.

Figure 4:
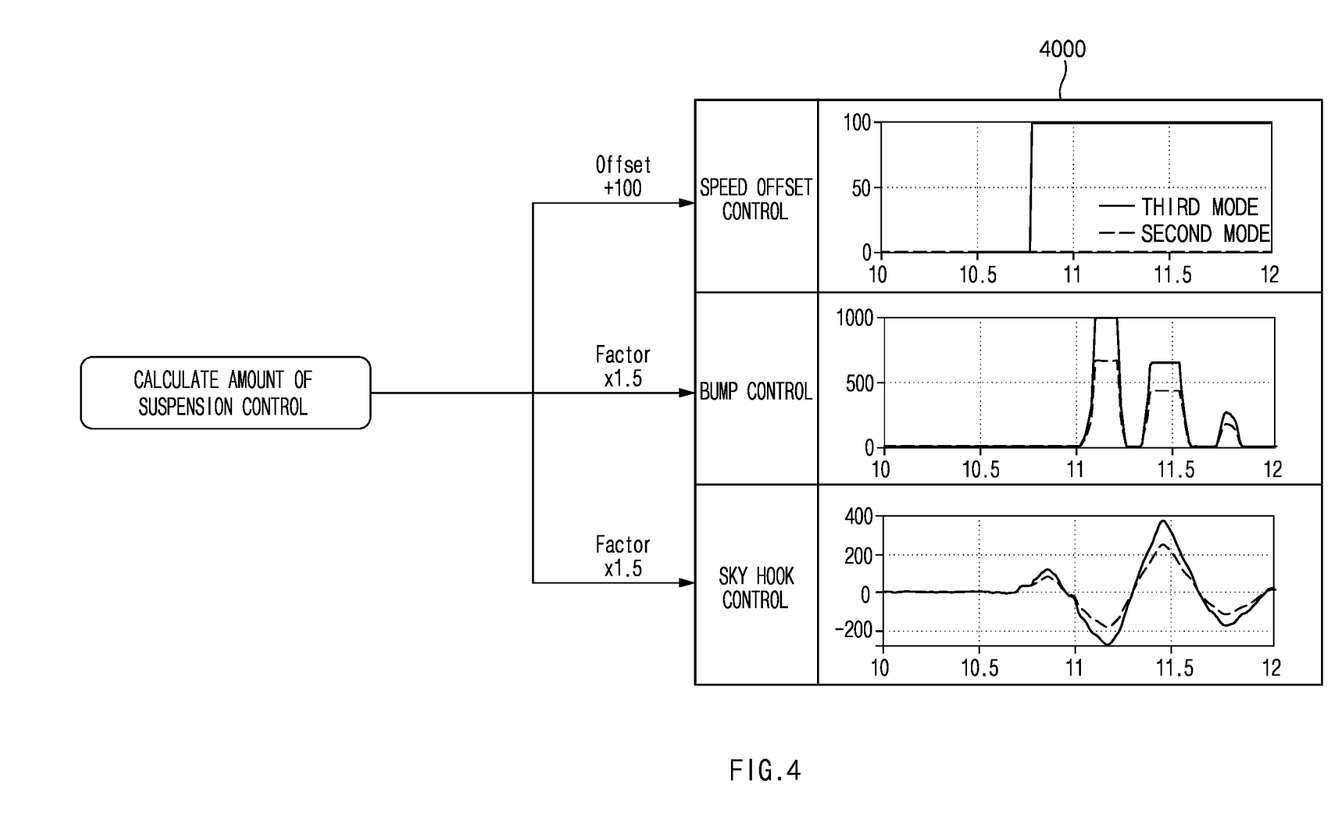
FIG. 4 is a drawing illustrating an example of an operation where a suspension control amount calculation device calculates an amount of suspension control according to embodiments.

FIG. 4 is a drawing illustrating an example of an operation where a suspension control amount calculation device 1002 calculates an amount of suspension control according to embodiments.

FIG. 4 is a drawing illustrating an example of an operation where a suspension control amount calculation device (e.g., a suspension control amount calculation device 1002 described in FIGS. 1 and 3) calculates an amount of suspension control according to embodiments. The operation of calculating the amount of suspension control in the suspension control amount calculation device 1002 described in FIG. 4 may be an operation of determining a mode of a shock absorber before the vehicle enters a speed bump, when the same type of speed bump is identified later, after the mode is determined a plurality of number of times.

As described above with reference to FIGS. 1 to 3, the suspension control amount calculation device 1002 may calculate an amount of suspension control for passing over the speed bump, based on the determined mode of the shock absorber.

As described above with reference to FIG. 1, the amount of suspension control according to embodiments may be an amount of control applied to the suspension of the vehicle to absorb and/or dampen a shock of the vehicle, in response to the shock of the vehicle.

The amount of suspension control according to embodiments may indicate one of an amount of suspension control calculated based on the first mode, an amount of suspension control calculated based on the second mode, or an amount of suspension control calculated based on the third mode. Furthermore, the amount of suspension control calculated based on the first mode may be less than the amount of suspension control calculated based on the second mode. Furthermore, the amount of suspension control calculated based on the third mode may be greater than the amount of suspension control calculated based on the second mode.

The amount of suspension control according to embodiments may include at least one of the amount of control for a speed offset of the vehicle, the amount of control for a bump of the vehicle, or the amount of control for a sky hook of the vehicle. The amount of control for the speed offset of the vehicle may be the amount of control for decelerating the vehicle. The amount of control for the bump of the vehicle may be the amount of control for the bump included in the vehicle to absorb a shock of the vehicle. The amount of control for the sky hook of the vehicle may be the amount of control for the sky hook included in the vehicle to implement flat driving sense of the vehicle.

In other words, when the amount of control for the speed offset of the vehicle, the amount of control for the bump of the vehicle, and the amount of control for the sky hook of the vehicle are large, an apparatus 1000 of FIG. 1 may absorb a larger shock.

4000 may indicate an operation of calculating the amount of suspension control for passing over the speed bump, based on the third mode in the suspension control amount calculation device 1002.

As described above, the amount of suspension control calculated based on the third mode may be greater than the amount of suspension control calculated based on the second mode. For example, the amount of suspension control based on the third mode may be calculated by adding 100 to the amount of speed offset control included in the amount of suspension control calculated based on the second mode, multiplying the amount of bump control by 1.5, and multiplying the amount of sky hook control by 1.5. In other words, the speed of the vehicle may more decrease than the second mode, and the amount of bump control and the amount of sky hook control may be higher than the second mode.

Through the method described in FIG. 4, the apparatus 1000 according to embodiments may predict a behavior of the vehicle and may control the suspension, when the speed bump to apply a shock to the vehicle is identified. Furthermore, when the speed bump to apply the shock to the vehicle is identified, the apparatus 1000 may predict an error of the shock absorber for vehicle, which is capable of being generated in response to the identified speed bump, and may reflect the error of the shock absorber in advance to control the suspension.

Figure 5:
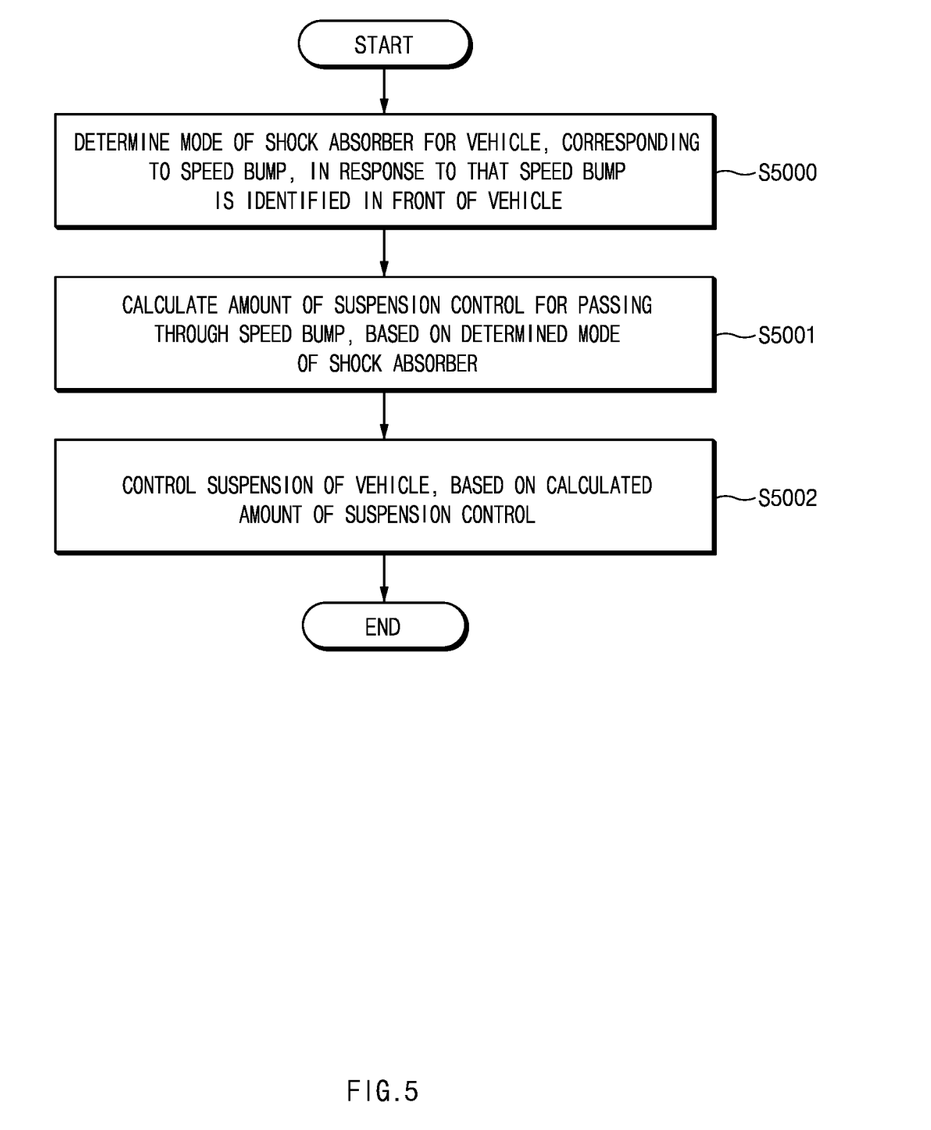
FIG. 5 is a flowchart illustrating an example of a vehicle suspension control method according to embodiments.

FIG. 5 is a flowchart illustrating an example of a vehicle suspension control method according to embodiments.

FIG. 5 is a flowchart illustrating an example of a vehicle suspension control method (or a method) according to embodiments. An apparatus 1000 of FIG. 1 according to embodiments may perform the method described in FIG. 5.

The method according to embodiments may include determining (S5000) a mode of a shock absorber for vehicle, corresponding to a speed bump, in response to the speed bump being identified in front of a vehicle, calculating (S5001) for calculating an amount of suspension control for passing over the speed bump, based on the determined mode of the shock absorber, and controlling (S5002) a suspension of the vehicle based on the calculated amount of suspension control. The method according to embodiments may further include one or more steps which is or are not described in FIG. 5.

The determined mode of the shock absorber according to embodiments may indicate one of a first mode, a second mode, or a third mode.

According to embodiments, a damping force of the shock absorber based on the first mode may be greater than a damping force of the shock absorber based on the second mode, and a damping force of the shock absorber based on the third mode may be less than the damping force of the shock absorber based on the second mode. A description of the first mode, the second mode, and the third mode may be the same or similar to that described above with reference to FIGS. 1 to 4.

The mode of the shock absorber according to embodiments may be determined based on a count value for the first mode, a count value for the second mode, and a count value for the third mode. A description of the count value for the first mode, the count value for the second mode, and the count value for the third mode may be the same or similar to that described above with reference to FIGS. 2 to 4.

The mode of the shock absorber according to embodiments may be determined based on a difference value between the count value for the first mode and the count value for the second mode, a difference value between the count value for the second mode and the count value for the third mode, and a difference value between the count value for the third mode and the count value for the first mode.

The mode of the shock absorber according to embodiments may be determined based on the largest value among the count value for the first mode, the count value for the second mode, or the count value for the third mode.

A description of the method of determining the mode of the shock absorber according to embodiments may be the same or similar to that described above with reference to FIG. 3.

According to embodiments, the count value for the first mode, the count value for the second mode, and the count value for the third mode may be counted based on at least one of type information of a speed bump or behavior information of a vehicle passing over the speed bump. A description of the type information of the speed bump and the behavior information of the vehicle passing over the speed bump may be the same or similar to that described above with reference to FIG. 3.

According to embodiments, the behavior information of the vehicle passing over the speed bump may include at least one of maximum vertical acceleration information of the vehicle or maximum pitch rate information of the vehicle. A description of the maximum vertical acceleration information of the vehicle and the maximum pitch rate information of the vehicle may be the same or similar to that described above.

The count value for the first mode according to embodiments may be counted in response to the behavior information of the vehicle being greater than or equal to a predetermined first value. The count value for the third mode according to embodiments may be counted in response to the behavior information of the vehicle being less than or equal to a predetermined second value. According to embodiments, the predetermined first value may be greater than the predetermined second value. The count value for the second mode according to embodiments may be counted in response to the behavior information of the vehicle being greater than the predetermined second value and less than the predetermined first value. A description of the above-mentioned count process may be the same or similar to that described above with reference to FIG. 3.

The calculated amount of suspension control according to embodiments may indicate one of an amount of suspension control calculated based on the first mode, an amount of suspension control calculated based on the second mode, or an amount of suspension control calculated based on the third mode. According to embodiments, the amount of suspension control calculated based on the first mode may be less than the amount of suspension control calculated based on the second mode, and the amount of suspension control calculated based on the third mode may be greater than the amount of suspension control calculated based on the second mode.

A description of the amount of suspension control calculated based on the first mode, the amount of suspension control calculated based on the second mode, and the amount of suspension control calculated based on the third mode according to embodiments may be the same or similar to that described above with reference to FIG. 4.

The amount of suspension control according to embodiments may include at least one of the amount of control for a speed offset of the vehicle, the amount of control for a bump of the vehicle, or the amount of control for a sky hook of the vehicle. A description of the amount of control for the speed offset of the vehicle, the amount of control for the bump of the vehicle, or the amount of control for the sky hook of the vehicle may be the same or similar to that described with reference to FIG. 4.

Through the method described in FIG. 5, the apparatus 1000 according to embodiments may predict a behavior of the vehicle and may control the suspension, when the speed bump to apply a shock to the vehicle is identified. Furthermore, when the speed bump to apply the shock to the vehicle is identified, the apparatus 1000 may predict an error of the shock absorber for vehicle, which is capable of being generated in response to the identified speed bump, and may reflect the error of the shock absorber in advance to control the suspension.

Embodiments may predict a behavior of a vehicle in response to a shock to be applied to the vehicle and accurately and safely control the suspension.

Furthermore, embodiments may predict an error of a shock absorber for vehicle in response to a shock to be applied to the vehicle and accurately and safely control the suspension.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A vehicle suspension control apparatus, comprising:
   a mode determination device configured to determine a mode of a shock absorber for a vehicle, the mode corresponding to an identified speed bump, when the speed bump is identified in front of the vehicle;
   a suspension control amount calculation device configured to calculate an amount of suspension control for passing over the speed bump, based on the determined mode of the shock absorber; and
   a controller configured to control a suspension of the vehicle based on the calculated amount of suspension control,
   wherein the amount of suspension control includes at least one of an amount of control for a speed offset of the vehicle, an amount of control for a bump of the vehicle, or an amount of control for a sky hook of the vehicle.

2. The vehicle suspension control apparatus of claim 1, wherein the determined mode of the shock absorber indicates one of a first mode, a second mode, or a third mode, wherein the determined mode of the shock absorber is determined based on a count value for the first mode, a count value for the second mode, and a count value for the third mode, and wherein the count value indicates a value counted in response to determining the mode of the shock absorber, the mode corresponding to the identified speed bump.

3. The vehicle suspension control apparatus of claim 2, wherein the determined mode of the shock absorber is determined based on a difference value between the count value for the first mode and the count value for the second mode, a difference value between the count value for the second mode and the count value for the third mode, and a difference value between the count value for the third mode and the count value for the first mode.

4. The vehicle suspension control apparatus of claim 2, wherein the determined mode of the shock absorber is determined based on the largest count value among the count value for the first mode, the count value for the second mode, and the count value for the third mode.

5. The vehicle suspension control apparatus of claim 2, wherein a damping force of the shock absorber based on the first mode is greater than a damping force of the shock absorber based on the second mode, and wherein a damping force of the shock absorber based on the third mode is less than the damping force of the shock absorber based on the second mode.

6. The vehicle suspension control apparatus of claim 2, wherein the count value for the first mode, the count value for the second mode, and the count value for the third mode are counted based on at least one of type information of the speed bump or behavior information of a vehicle passing over the speed bump.

7. The vehicle suspension control apparatus of claim 6, wherein the behavior information of the vehicle passing over the speed bump includes at least one of maximum vertical acceleration information of the vehicle or maximum pitch rate information of the vehicle.

8. The vehicle suspension control apparatus of claim 6, wherein the count value for the first mode is counted in response to the behavior information of the vehicle being greater than or equal to a predetermined first value, wherein the count value for the third mode is counted in response to the behavior information of the vehicle being less than or equal to a predetermined second value, wherein the predetermined first value is greater than the predetermined second value, and wherein the count value for the second mode is counted in response to the behavior information of the vehicle being greater than the predetermined second value or less than the predetermined first value.

9. The vehicle suspension control apparatus of claim 2, wherein the calculated amount of suspension control indicates one of an amount of suspension control calculated based on the first mode, an amount of suspension control calculated based on the second mode, or an amount of suspension control calculated based on the third mode, wherein the amount of suspension control calculated based on the first mode is less than the amount of suspension control calculated based on the second mode, and wherein the amount of suspension control calculated based on the third mode is greater than the amount of suspension control calculated based on the second mode.

10. A vehicle suspension control method, comprising:

determining a mode of a shock absorber for a vehicle, the mode corresponding to an identified speed bump, when the speed bump is identified in front of the vehicle;

calculating an amount of suspension control for passing over the speed bump, based on the determined mode of the shock absorber; and controlling a suspension of the vehicle based on the calculated amount of suspension control, wherein the amount of suspension control includes at least one of an amount of control for a speed offset of the vehicle, an amount of control for a bump of the vehicle, or an amount of control for a sky hook of the vehicle.

11. The vehicle suspension control method of claim 10, wherein the determined mode of the shock absorber indicates one of a first mode, a second mode, or a third mode, wherein the determined mode of the shock absorber is determined based on a count value for the first mode, a count value for the second mode, and a count value for the third mode, and wherein the count value indicates a value counted in response to determining the mode of the shock absorber, the mode corresponding to the identified speed bump.

12. The vehicle suspension control method of claim 11, wherein the determined mode of the shock absorber is determined based on a difference value between the count value for the first mode and the count value for the second mode, a difference value between the count value for the second mode and the count value for the third mode, and a difference value between the count value for the third mode and the count value for the first mode.

13. The vehicle suspension control method of claim 11, wherein the determined mode of the shock absorber is determined based on the largest count value among the count value for the first mode, the count value for the second mode, and the count value for the third mode.

14. The vehicle suspension control method of claim 11, wherein a damping force of the shock absorber based on the first mode is greater than a damping force of the shock absorber based on the second mode, and wherein a damping force of the shock absorber based on the third mode is less than the damping force of the shock absorber based on the second mode.

15. The vehicle suspension control method of claim 11, wherein the count value for the first mode, the count value for the second mode, and the count value for the third mode are counted based on at least one of type information of the speed bump or behavior information of a vehicle passing over the speed bump.

16. The vehicle suspension control method of claim 15, wherein the behavior information of the vehicle passing over the speed bump includes at least one of maximum vertical acceleration information of the vehicle or maximum pitch rate information of the vehicle.

17. The vehicle suspension control method of claim 15, wherein the count value for the first mode is counted in response to the behavior information of the vehicle being greater than or equal to a predetermined first value, wherein the count value for the third mode is counted in response to the behavior information of the vehicle being less than or equal to a predetermined second value, wherein the predetermined first value is greater than the predetermined second value, and wherein the count value for the second mode is counted in response to the behavior information of the vehicle being greater than the predetermined second value or less than the predetermined first value.

18. The vehicle suspension control method of claim 11, wherein the calculated amount of suspension control indicates one of an amount of suspension control calculated based on the first mode, an amount of suspension control calculated based on the second mode, or an amount of suspension control calculated based on the third mode,
   wherein the amount of suspension control calculated based on the first mode is less than the amount of suspension control calculated based on the second mode, and
   wherein the amount of suspension control calculated based on the third mode is greater than the amount of suspension control calculated based on the second mode.

* * * * *